Jan. 10, 1961  D. B. SCOTT, JR  2,967,376
METHOD FOR TREATING SEEDS, AND PRODUCT OF SAID METHOD
Filed Feb. 27, 1958
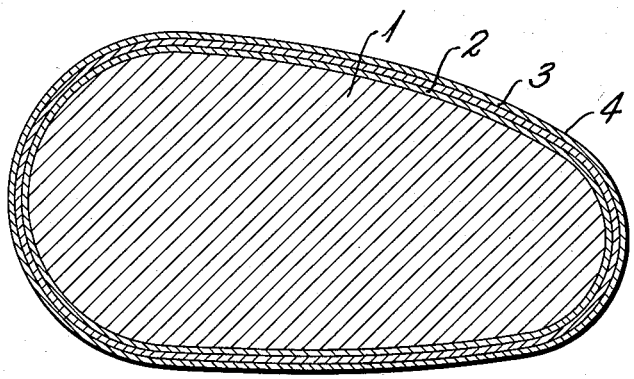
INVENTOR
*David B. Scott, Jr.*
BY *Burns, Doane, Benedict & Sworn*
ATTORNEYS

United States Patent Office 2,967,376
Patented Jan. 10, 1961

2,967,376
METHOD FOR TREATING SEEDS, AND PRODUCT OF SAID METHOD

David B. Scott, Jr., Salinas, Calif., assignor to Soilserv, Incorporated, Salinas, Calif., a corporation of California Filed Feb. 27, 1958, Ser. No. 717,838

17 Claims. (Cl. 47—1)

This invention relates to the treating of seeds and particularly to an improved coating process for the control of seed growth and the prevention of the destructive effects of insects, mites, fungi and bacteria.

It has been known in the seed treating art that better germination, more rapid growth, and resistance to the effects of excessively wet weather and other adverse influences after planting might be obtained by coating the seed with particular types of material. Efforts have been made to apply insect and rot repellant coatings and to include with each seed, nutrient or fertilizing elements which would provide the farmer with more abundant yields in proportion to the quantity of seed planted.

The present invention is directed especially to a method involving the addition to seed of insecticides, miticides, fungicides, bactericides and of other material needed for seed growth or stimulation. They may be added in wettable powder form, or in liquid forms which do not contain harmful solvents. These materials are added in such a way as to produce dry, free-flowing seed, regardless of size, with properties beneficial to germination and which will not result in caking during storage or while being handled in seed planting machines.

The basic method hitherto used has involved adding dry pesticide and water to the seed and mixing to form a wet slurry. This process was applicable primarily to the coating of larger seeds, which could be dried thereafter in order to permit free flow through the seeding machines during planting. Such a process was found to give incomplete coverage when dealing with the smaller, finer, seeds. For example, beans, spinach, sugar beets and peas could be coated by the wet slurry method and dried with some degree of success. However, small seeds, such as lettuce, celery, carrots, onion and the like were incompletely coated and could not readily be dried. Rather, the seeds tended to form a conglomerate in which the slurry coating adhered only to the surfaces of the larger elements of the mass. Since the coating did not cover the individual seeds with any degree of regularity, the overall treatment was relatively ineffective. Incomplete drying interfered with free flow through the seeding machines, and the results were, in general, not satisfactory. The present process overcomes these difficulties and is effective in coating all sizes of seeds.

While usually it is preferred to coat the seed with pesticide, bactericide, fungicidal and fertilizing or nutrient materials, it is in certain cases desirable to add such components as would encourage the growth of particular types of bacteria. In fact, it is necessary for the germination of some types of seeds that these bacteria and additional components, such as added nitrogen or other fertilizing elements, be included with the seed in order to insure a proper growth.

The instant process involves adding to a desired weight of dry seed a properly proportionate quantity of a pesticide, which as used hereinafter in this specification and in the claims is defined to include insecticides, miticides, bactericides and fungicides, and placing it in a mixer, either in dry or liquid form, where the two are well blended together mechanically. As a next step "stickers" or adherent materials are added which will insure the uniform retention about the seed of materials to be added thereafter. After these components have been well blended together, a preferred quantity of humectant or hygroscopic agent is added, which will, after the seed has been planted, have the property of drawing moisture to the seed at the proper time to assist in germination.

To the mixture a preferred proportion of water is now added to assist in blending the component elements together in a uniformly adherent form, and the whole is thoroughly mixed until it becomes a heavy, sticky mass. The various layers need not necessarily be completely distinct. At this point the material is difficult to handle. The following step involves mixing with a preferred quantity of a coating conditioning agent to bring the mass back to a condition of flowability, and to prevent caking in storage. The amount of the coating conditioning agent added is slightly greater than the minimum necessary for proper flowability. This results in a small amount of apparent dustiness on the finished seed. Such an excess condition is helpful in obtaining the proper slip between the individual seeds.

When it is time for planting it will be found that the seed will have superior free-flowing properties, will germinate more quickly, and will be more resistant to insects, mites and fungi.

It will thus be seen that the primary object of the invention is to provide an improved method for treating seed prior to planting.

Another object is to provide an improved method of protecting the seed against adverse influences at critical times during its life.

Still another object is to provide a method of coating seeds of all sizes, particularly fine seeds.

A further object is to provide a method of seed coating which will reduce the tendency to cake in storage and will permit ready flow in seeding machines.

Yet another object is to provide improved means for so coating seeds as to permit quicker germination.

These and other objects will be readily understood by the following detailed description and the following examples which are given for illustrative purposes only.

Considering now the details of the steps involved in the process, the first step involves the addition of weighed amounts of seeds and a pesticide (which term as defined above includes insecticides, miticides, fungicides and bactericides), in either dry or liquid form in proportions which will be set forth in specific examples hereinafter. After the seed and the pesticide have been well mixed, I prefer to add from 0.5% to substantially 6% of the weight of the dry seed of "stickers" or adherent materials, such as methyl cellulose, ethyl cellulose, water soluble hydroxyethyl cellulose, sodium carboxymethyl cellulose, sodium alginate, water soluble gums of karaya or tragacanth, polyvinylalcohol and high molecular weight, water soluble polymers of ethylene oxide. Any of these materials will insure the proper adherence to the seed of the other agents to be added and will provide a protective coating of beneficial nature.

After these ingredients have been thoroughly blended, as a second step, from 0.25% to 6% of the dry seed weight of humectants or hygroscopic agents are added and thoroughly mixed. These agents readily absorb and retain moisture after the seed has been planted in the ground, and, in addition, act as plasticizers for the cellulose coatings added or applied in the previous step. The additional moisture so brought close to the seed assists in more rapid germination at the proper time. The materials which I have found suitable for this purpose include the following: sorbitol, ethylene glycol, glycerol, invert sugar, sulfonated castor oil, mannitol, 1, 2,6 hexanetriol, diethylene glycol, triethylene glycol, polyethylene glycol, propylene glycol, dipropylene glycol, sodium lactate, dextrin, polyoxyethylene glycerin, D-talitol, glucose, polyoxyethylene sorbitol, and sucrose.

Immediately after mixing the humectants or hygroscopic agents well with the previous blend, as a third step, water in the proportion of from 0.5% to 6% by weight of the dry seed is added to the mixture. This proportion should be no greater than that of the sticker material, and under some conditions may be reduced substantially to zero. The mass is then stirred until it is well blended. This conglomerate will appear sticky and heavy at this point.

In some cases it is desirable to combine steps two and three by mixing the water with the humectants before adding them to the seed mass, and it is sometimes possible, though less effective, to apply the sticker, humectant, pesticide and water in a single suspension, as in Example G set forth hereinafter.

The mixing is now continued until a uniformly blended mass is obtained.

As a fourth step, conditioning material is added to bring the mixture back to a state of proper flowability and prevent caking. To accomplish this, I add from 1% to 5% by weight of the dry seed of silica aerogel, colloidal silica, synthetic or hydrated calcium silicate, precipitated calcium silicate, amorphous silica, finely powdered vermiculite, powdered mica (water-ground), or a hydrophobic starch ester derivative of ungelatinized granule corn starch, such as that known commercially under the trademark "Dry-Flo." Silica aerogel is commercially available under the trademarks "Santocel," "Hi-Sil" and "Aerosil." Synthetic calcium silicate is sold under the trademark "Microcel 800." Hydrated calcium silicate is commercially available under the trademark "Silene." After the mass has been well mixed with the specified proportion of these agents, it will then be in proper condition for storage and for ready flow in seeding machines. It will germinate rapidly on planting and will be protected against the action of insects, mites and fungi at the critical times.

The attached drawing is a schematic representation of a seed within the purview of this invention. Numeral 1 represents the seed, while numeral 2 represents an apparent layer of pesticide, numeral 3 represents an apparent layer of humectant, and numeral 4 represents an apparent layer of coating conditioning material. It will be obvious from the teaching of the foregoing specification that numeral 3 may comprise an apparent layer of adherent material and an apparent line of humectant. In order to illustrate the several materials which surround the seed, the coating illustrated in the drawing has not been scaled to correspond to the percentages set out above for the various materials.

Specific examples of mixtures which have been used successfully for various types of seed are as follows:

A

| | | |
|---|---|---|
| Celery seed | lbs | 100 |
| (1) Captan 50 | ounces | 4 |
| (2) Sodium carboxymethylcellulose | lb | 1 |
| (3) Sorbitol—70% solution | lbs | 2 |
| (4) Water | lb | ½ |
| (5) Microcel 800 | lbs | 2 |

B

| | | |
|---|---|---|
| Celery seed | lbs | 100 |
| (1) Dieldrin 50 W | ounces | 4 |
| (2) Hydroxyethyl cellulose | lb | 1 |
| (3) Polyethylene glycol 200 | lbs | 3 |
| (4) Water | lb | ½ |
| (5) Santocel | lb | 1 |

C

| | | |
|---|---|---|
| Onion seed | lbs | 100 |
| (1) Dieldrin 50 W | lbs | 2 |
| Captan 50 W | ounces | 8 |
| (2) Polyethylene glycol 200 | lbs | 3 |
| (3) Microcel 800 | lbs | 2 |

D

| | | |
|---|---|---|
| Celery seed | lbs | 100 |
| (1) Dieldrin 50 W | ounces | 4 |
| Captan 50 W | do | 4 |
| (2) Hydroxyethyl cellulose | lb | 1 |
| (3) Invert sugar | lbs | 2 |
| (4) Water | lb | ½ |
| (5) Dry-Flo starch | lbs | 2 |

E

| | | |
|---|---|---|
| Broccoli seed | lbs | 100 |
| (1) Dieldrin 50 W | ounces | 4 |
| Captan 50 W | do | 4 |
| (2) Methyl cellulose | lb | 1 |
| (3) Glycerol or glycerin | lbs | 3 |
| (4) Water | lb | 1 |
| (5) Hisil | lbs | 2 |

F

| | | |
|---|---|---|
| Broccoli seed | lbs | 100 |
| (1) Dieldrin 50 W | ounces | 4 |
| Captan 50 W | do | 4 |
| (2) Polyethylene glycol 400 | lb | 1 |
| (3) Santocel | lb | ¼ |
| (4) Dry-Flo starch | lbs | 1½ |

G

| | | |
|---|---|---|
| Broccoli seed | lbs | 100 |
| (1) Spray on a slurry containing water | lb | 0.2 |
| (2) Polyethylene glycol | lb | 1 |
| (3) Dieldrin 50 W | ounces | 8 |

When seed is thoroughly coated, add:

| | | |
|---|---|---|
| (4) Dry-Flo starch | lbs | 2 |

The active ingredient in Captan 50 W or Captan 50 is: (N-trichloromethylmercapto—4—cyclohexene—1: 2—dicarboximide). The active ingredient in Dieldrin 50 W is 1, 2, 3, 4, 10, 10-hexachloro-6, 7-epoxy-1, 4, 4a, 5, 6, 7, 8, 8a-octahydro-1, 4-endo, exo-5, 8-dimethanonaphthalene.

Seeds treated in accordance with the above examples have shown ease of handling in seeding equipment with marked advances in their ability to resist adverse conditions after plantings, in rapid germination, and in increased yields. The seeds are uniformly coated, regardless of size, and do not cake in storage. The successive steps of treatment, taken in the specified order, result in an improved seed product. The close tolerances specified, particularly with water and humectant materials, are important in maintaining the shelf life of the seeds. The ranges specified are ultimately related to the seed and proper to minimize erosion of the coating during handling and seeding. It will be understood, however, that these examples are not exclusive, and that the method described is applicable to other seeds as well.

From the foregoing description, the uses and advantages of my invention will be readily understood by those skilled in the art to which the invention appertains. While I have described my invention in detail and with respect to preferred examples thereof, I desire to have it understood that the examples described are merely illustrative and that the invention is not to be limited to the details disclosed herein, but is to be accorded the full scope of the appended claims.

I claim:

1. The method of treating seeds to provide a free-flowing coated seed which comprises mixing dry seed with a pesticide, adding from about 0.25% to about 6% on the weight of the dry seed of a humectant and from about 1% to about 5% by weight based on the weight of the dry seed of a coating conditioning material.

2. The method of claim 1 wherein the materials are added in a substantially water-free condition.

3. The method of claim 1 wherein from about 0.5% to about 6% of a retaining material is added to the dry seed before the addition of the humectant.

4. A method of treating seeds which comprises the steps of: mixing defined amounts of dry seed and material for controlling seed growth and stimulation, and material for combatting pests, mixing therewith retaining material selected from the group consisting of methyl cellulose, ethyl cellulose, water-soluble hydroxyethyl cellulose, sodium carboxymethyl cellulose, sodium alginate, water-soluble gums of karaya and tragacanth, polyvinylalcohol and high molecular weight, water soluble polymers of ethylene oxide substantially in the proportion of about 0.5% to about 6% by weight of said dry seed; mixing therewith substantially from about 0.25% to about 6% by weight of said dry seed humectants selected from the group consisting of sorbitol, ethylene glycol, glycerol, invert sugar, sulfonated castor oil, mannitol, 1, 2, 6 hexanetriol, diethylene glycol, triethylene glycol, polyethylene glycol, propylene glycol, dipropylene glycol, sodium lactate, dextrin, polyoxyethylene glycerin, D-talitol, glucose, polyoxyethylene sorbitol and sucrose; adding to said mass and mixing therewith from about 1% to about 5% by weight of said dry seed of material for improving the flowability of said mixture selected from the class consisting of silica aerogel, colloidal silica, synthetic calcium silicate, hydrated calcium silicate, precipitated calcium silicate, amorphous silica, finely powdered vermiculite, powdered water ground mica and a hydrophobic starch ester derivative of ungelatinized granule corn starch.

5. The method of claim 4 wherein water is added in amounts from substantially about 0.0% to about 6% by weight of the dry seed immediately following the addition of the humectant.

6. A method of treating seeds which comprises the steps of: mixing defined amounts of dry seed and material for controlling seed growth and stimulation, and material for combatting pests, mixing therewith retaining material selected from the group consisting of methyl cellulose, ethyl cellulose, water-soluble hydroxyethyl cellulose, sodium carboxymethyl cellulose, sodium alginate, water-soluble gums of karaya and tragacanth, polyvinylalcohol and high molecular weight, water soluble polymers of ethylene oxide; mixing therewith humectants selected from the group consisting of sorbitol, ethylene glycol, glycerol, invert sugar, sulfonated castor oil, mannitol, 1, 2, 6 hexanetriol, diethylene glycol, triethylene glycol, polyethylene glycol, propylene glycol, dipropylene glycol, sodium lactate, dextrin, polyoxyethylene glycerin, D-talitol, glucose, polyoxyethylene sorbitol and sucrose; adding to said mass and mixing therewith material for improving the flowability of said mixture selected from the class consisting of silica aerogel, colloidal silica, synthetic calcium silicate, hydrated calcium silicate, precipitated calcium silicate, amorphous silica, finely powdered vermiculite, powdered water ground mica and a hydrophobic starch ester derivative of ungelatinized granule corn starch.

7. A method of treating seeds which comprises the steps of: mixing defined amounts of dry seed and material for controlling seed growth and stimulation, and material for combatting pests, mixing therewith dry seed humectants selected from the group consisting of sorbitol, ethylene glycol, glycerol, invert sugar, sulfonated castor oil, mannitol, 1, 2, 6 hexanetriol, diethylene glycol, triethylene glycol, polyethylene glycol, propylene glycol, dipropylene glycol, sodium lactate, dextrin, polyoxyethylene glycerin, D-talitol, glucose, polyoxyethylene sorbitol and sucrose; adding to said mass and mixing therewith material for improving the flowability of said mixture selected from the class consisting of silica aerogel, colloidal silica, synthetic calcium silicate, hydrated calcium silicate, precipitated calcium silicate, amorphous silica, finely powdered vermiculite, powdered water ground mica and a hydrophobic starch ester derivative of ungelatinized granule corn starch.

8. A method of treating seeds which comprises the steps of: mixing defined amounts of dry seed and material for controlling seed growth and stimulation, and material for combatting pests, mixing therewith substantially from about 0.25% to about 6% by weight of said dry seed of a humectant, adding to said mass and mixing therewith from about 1% to about 5% by weight of said dry seed of material for improving the flowability of said mixture selected from the class consisting of silica aerogel, colloidal silica, synthetic calcium silicate, hydrated calcium silicate, precipitated calcium silicate, amorphous silica, finely powdered vermiculite, powdered water ground mica and a hydrophobic starch ester derivative of ungelatinized granule corn starch.

9. The method of claim 8 wherein water is added in amounts from substantially about 0.0% to about 6% by weight of the dry seed immediately following the addition of the humectant.

10. A method of treating seeds which comprises the steps of: mixing defined amounts of dry seed and material for controlling seed growth and stimulation, and material for combatting pests, mixing therewith retaining material selected from the group consisting of methyl cellulose, ethyl cellulose, water-soluble hydroxyethyl cellulose, sodium carboxymethyl cellulose, sodium alginate, water-soluble gums of karaya and tragacanth, polyvinylalcohol and high molecular weight, water soluble polymers of ethylene oxide substantially in the proportion of about 0.5% to about 6% by weight of said dry seed; mixing therewith substantially from about 0.25% to about 6% by weight of said dry seed of a humectant; adding to said mass and mixing therewith from about 1% to about 5% by weight of said dry seed of material for improving the flowability of said mixture selected from the class consisting of silica aerogel, colloidal silica, synthetic calcium silicate, hydrated calcium silicate, precipitated calcium silicate, amorphous silica, finely powdered vermiculite, powdered water ground mica and a hydrophobic starch ester derivative of ungelatinized granule corn starch.

11. The method of claim 10 wherein water is added in amounts from substantially about 0.0% to about 6% by weight of the dry seed immediately following the addition of the humectant.

12. A method of treating seeds which comprises the steps of: mixing defined amounts of dry seed and material for controlling seed growth and stimulation, and material for combatting pests, mixing therewith retaining material selected from the group consisting of methyl cellulose, ethyl cellulose, water-soluble hydroxyethyl cellulose, sodium carboxymethyl cellulose, sodium alginate, water-soluble gums of karaya and tragacanth, polyvinylalcohol and high molecular weight, water soluble polymers of ethylene oxide substantially in the proportion of about 0.5% to about 6% by weight of said dry seed; mixing therewith substantially from about 0.25% to about 6% by weight of said dry seed humectants selected from the group consisting of sorbitol, ethylene glycol, glycerol, invert sugar, sulfonated castor oil, mannitol, 1, 2, 6 hexanetriol, diethylene glycol, triethylene glycol, polyethylene glycol, propylene glycol, dipropylene glycol, sodium lactate, dextrin, polyoxethylene glycerin, D-talitol, glucose, polyoxyethylene sorbitol and sucrose; adding to said mass and mixing therewith from about 1% to about 5% by weight of said dry seed of a material for improving the flowability of said mixture.

13. The method of claim 12 wherein water is added in amounts from substantially about 0.0% to about 6% by weight of the dry seed immediately following the addition of the humectant.

14. A method of treating seeds which comprises the steps of: mixing defined amounts of dry seed and material for controlling seed growth and stimulation, and material for combatting pests, mixing therewith substantially from about 0.25% to about 6% by weight of said dry seed humectants selected from the group consisting of sorbitol, ethylene glycol, glycerol, invert sugar, sulfonated castor oil, mannitol, 1, 2, 6 hexanetriol, diethylene glycol, triethylene glycol, polyethylene glycol, propylene glycol, dipropylene glycol, sodium lactate, dextrin, polyoxyethylene glycerin, D-talitol, glucose, polyoxyethylene sorbitol and sucrose; adding to said mass and mixing therewith from about 1% to about 5% by weight of said dry seed of a material for improving the flowability of said mixture.

15. The method of claim 14 wherein water is added in amounts from substantially about 0.0% to about 6% by weight of the dry seed immediately following the addition of the humectant.

16. A dry, treated seed product comprising a seed having coatings thereon of a pesticide; a retaining material in amounts from about 0.5% to about 6% of the weight of the dry seed; a humectant mixed with and about said retaining material, said humectant being present in amounts from about 0.25% to about 6% by weight of the dry seed; and a coating conditioning material mixed with and about said retaining and humectant material, said coating conditioning material being present in amounts from about 1% to about 5% by weight of the dry seed.

17. A dry, free-flowing treated seed product comprising a seed having a first coating of a pesticide; a second coating containing from about 0.25% to about 6% by weight of the dry seed of humectant material; and a coating conditioning material in amounts from about 1% to about 5% by weight of the dry seed mixed with and about said humectant material.

References Cited in the file of this patent

UNITED STATES PATENTS

| | | |
|---|---|---|
| 2,313,057 | Fischer | Mar. 9, 1943 |
| 2,502,809 | Vogelsang | Apr. 4, 1950 |
| 2,579,735 | Burgesser | Dec. 25, 1951 |
| 2,656,649 | Ostier | Oct. 27, 1953 |

FOREIGN PATENTS

| | | |
|---|---|---|
| 411,040 | Germany | Mar. 24, 1925 |

OTHER REFERENCES

Publication: Condensed Chemical Dictionary, fifth edition, published 1956 by Reinhold (N.Y.), pages 541 and 842.